(12) United States Patent
Wang et al.

(10) Patent No.: US 7,729,232 B2
(45) Date of Patent: Jun. 1, 2010

(54) METHOD OF TRANSMITTING AND RECEIVING DATA USING SUPERPOSITION MODULATION IN A WIRELESS COMMUNICATION SYSTEM

(75) Inventors: Shu Wang, San Diego, CA (US); Young C. Yoon, San Diego, CA (US); Sang G. Kim, San Diego, CA (US); Li-Hsiang Sun, San Diego, CA (US); Soonyil Kwon, San Diego, CA (US); Suk Woo Lee, San Diego, CA (US); Byung K. Yi, San Diego, CA (US)

(73) Assignee: LG Electronics Inc., Seoul (KR)

( * ) Notice: Subject to any disclaimer, the term of this patent is extended or adjusted under 35 U.S.C. 154(b) by 445 days.

(21) Appl. No.: 11/670,397

(22) Filed: Feb. 1, 2007

(65) Prior Publication Data

US 2007/0195907 A1 Aug. 23, 2007

Related U.S. Application Data

(60) Provisional application No. 60/764,607, filed on Feb. 1, 2006, provisional application No. 60/771,253, filed on Feb. 7, 2006, provisional application No. 60/774,404, filed on Feb. 17, 2006, provisional application No. 60/783,768, filed on Mar. 17, 2006, provisional application No. 60/784,975, filed on Mar. 22, 2006.

(51) Int. Cl.
   *H04J 11/00* (2006.01)
(52) U.S. Cl. .................. 370/203; 370/205; 370/208; 375/267
(58) Field of Classification Search ............ 375/240.27, 375/295, 261; 714/790; 370/206, 207, 338
   See application file for complete search history.

(56) References Cited

U.S. PATENT DOCUMENTS 5,581,578 A * 12/1996 De Bot ...................... 375/261

(Continued)

FOREIGN PATENT DOCUMENTS

EP 1434365 6/2004

(Continued)

OTHER PUBLICATIONS

Texas Instruments, "Improved double-STTD schemes using asymmetric modulation and antenna shuffling" 3GPP TSG-RAN WG1, TSGR#20(01)-0459, May 21, 2001.

(Continued)

*Primary Examiner*—Derrick W Ferris
*Assistant Examiner*—Gbemileke Onamuti
(74) *Attorney, Agent, or Firm*—Lee, Hong, Degerman, Kang & Waimey

(57) ABSTRACT

A method of transmitting and receiving data using superposition modulation in a wireless communication system having multiple antennas is disclosed. More specifically, the method comprises encoding the at least one inputted data stream by a channel coding scheme, puncturing the at least one inputted coded data stream into at least two sub-streams, layer-modulating the at least two sub-streams using layer-modulation schemes, transmitting the layered-modulated sub-streams via the multiple antennas, wherein transmission power of each antenna is based channel condition, and receiving by at least one user the layered-modulated sub-stream, wherein the each user uses different demodulation scheme.

9 Claims, 11 Drawing Sheets

U.S. PATENT DOCUMENTS

| | | |
|---|---|---|
| 6,934,317 B1 | 8/2005 | Dent |
| 6,952,454 B1 | 10/2005 | Jalali et al. |
| 2002/0010893 A1* | 1/2002 | Kim et al. ............... 714/790 |
| 2002/0131510 A1* | 9/2002 | Lin .................. 375/240.27 |
| 2005/0068918 A1 | 3/2005 | Matravadi et al. |
| 2005/0099937 A1* | 5/2005 | Oh et al. ................. 370/207 |
| 2006/0067422 A1* | 3/2006 | Chung ..................... 375/295 |
| 2007/0104163 A1* | 5/2007 | Kim ........................ 370/338 |
| 2007/0183303 A1* | 8/2007 | Pi et al. ................... 370/206 |

FOREIGN PATENT DOCUMENTS

| | | |
|---|---|---|
| EP | 1531560 | 5/2005 |
| WO | 03/023996 | 3/2003 |
| WO | 2005/020530 | 3/2005 |
| WO | 2005/067241 | 7/2005 |

OTHER PUBLICATIONS

Pietrzyk, S. et al. "Subcarrier and power allocation for QoS-aware OFDMA systems using embedded modulation" IEEE international conference on Communications, Jun. 20, 2004.

Kim et al. "Coordinate-Interleaved space-time coding with rotated constellation" IEEE Vehicular technology conference, Apr. 22, 2003.

* cited by examiner (a)  (b)  (c)

FIG. 7
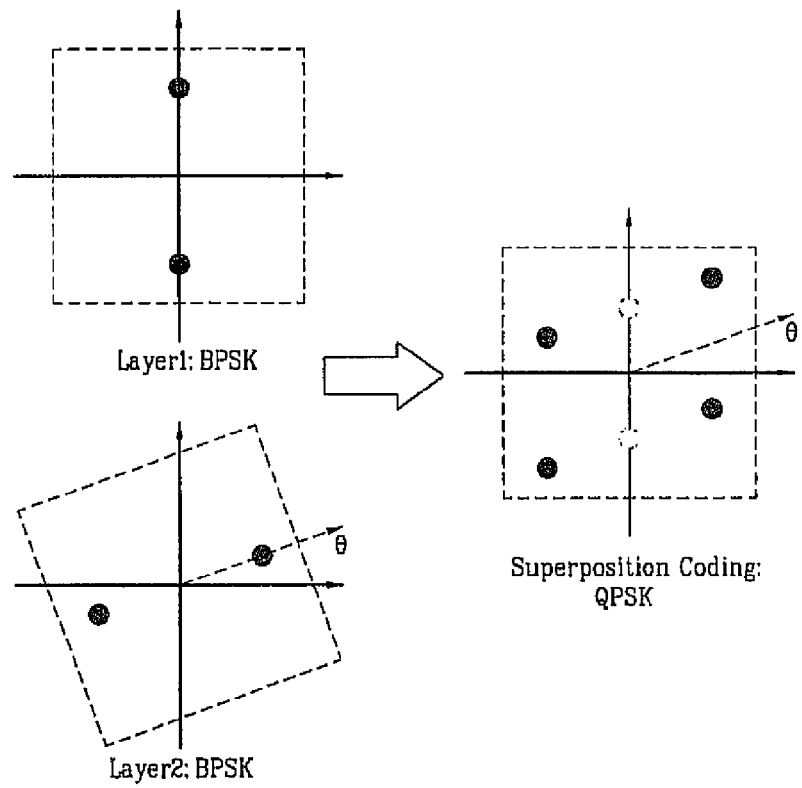
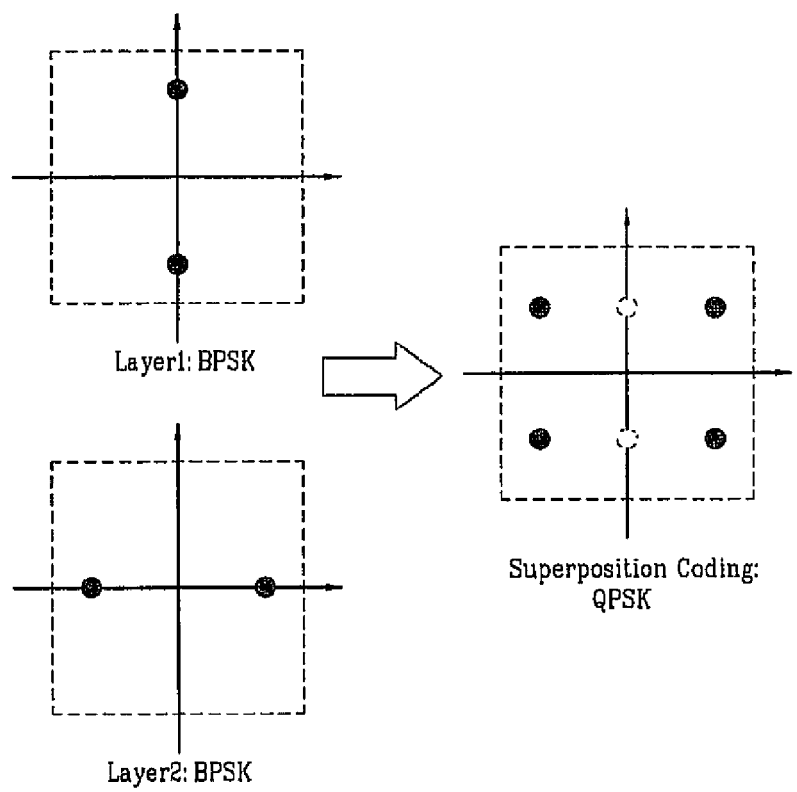

METHOD OF TRANSMITTING AND RECEIVING DATA USING SUPERPOSITION MODULATION IN A WIRELESS COMMUNICATION SYSTEM

This application claims the benefit of U.S. Provisional Application No. 60/764,607, filed on Feb. 1, 2006, U.S. Provisional Application No. 60/771,253, filed on Feb. 7, 2006, U.S. Provisional Application No. 60/774,404, filed on Feb. 17, 2006 U.S. Provisional Application No. 60/783,768, filed on Mar. 17, 2006, and U.S. Provisional Application No. 60/784,975, filed on Mar. 22, 2006, which are hereby incorporated by reference.

BACKGROUND OF THEE INVENTION

1. Field of the Invention

The present invention relates to a method of transmitting and receiving data, and more particularly, to a method of transmitting and receiving data using superposition modulation in a wireless communication system.

2. Discussion of the Related Art

Today, users of wireless communication enjoy freedom of mobility. That is, the user with a mobile terminal is able to travel from one place to another while talking to someone without losing connection. Often, a user moves from one service coverage area to another service coverage area (e.g., from one cell to another cell). In other words, the user receives service from one coverage area serviced by one base station (BS) (or an access network) to a different coverage area serviced by another BS. This is necessary since a mobile terminal can be connected to only one BS at a time.

When moving from one service coverage area to another service coverage area, it is important to the user to be able to continue to receive service without interruption or losing connection. This is generally referred to as a handoff (or handover). Further, in a more traditional sense, it is also very important for the user to continue to effectively receive service in the current service coverage area absent handover situation.

To this end, it is important that the signals from the BS are transmitted to at least one receiving end (e.g., mobile station or access terminal) more efficiently and more reliably.

SUMMARY OF THE INVENTION

Accordingly, the present invention is directed to a method of transmitting and receiving data using superposition modulation in a wireless communication system that substantially obviates one or more problems due to limitations and disadvantages of the related art.

An object of the present invention is to provide a method of transmitting at least one data stream in a wireless communication system having multiple antennas.

Another object of the present invention is to provide a method of receiving at least one data stream by at least one user in a wireless communication system having multiple antennas.

A further object of the present invention is to provide a system for transmitting and receiving at least one data stream by at least one user in a wireless communication system having multiple antennas.

Yet, in another object of the present invention is to provide a method of allocating resources to multiple users for transmitting data simultaneously in a wireless communication system.

Another object of the present invention is to provide a method of modulating a signal using a superposition modulation scheme in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting at least one data stream in a wireless communication system having multiple antennas includes encoding the at least one inputted data stream by a channel coding scheme, puncturing the at least one inputted coded data stream into at least two sub-streams, layer-modulating the at least two sub-streams using layer-modulation schemes, transmitting the layered-modulated sub-streams via the multiple antennas, wherein transmission power of each antenna is based channel condition, and receiving by at least one user the layered-modulated sub-stream, wherein the each user uses different demodulation scheme.

In another aspect of the present invention, a method of transmitting at least one data stream in a wireless communication system having multiple antennas includes encoding at least one inputted data stream by a channel coding scheme, puncturing the at least one inputted coded data stream into at least two sub-streams, modulating the at least two sub-streams using layered-modulation schemes in which at least one layer is rotated with respect to at least one other layer, transmitting the layered-modulated sub-streams via the multiple antennas, wherein transmission power of each antenna is based channel condition, and receiving by at least one user the layered-modulated sub-stream, wherein the each user uses different demodulation scheme.

In a further aspect of the present invention, a method of receiving at least one data stream by at least one user in a wireless communication system having multiple antennas includes receiving a layered-modulated sub-stream transmitted via at least one antenna. Here, the layered-modulated sub-stream comprises at least two sub-streams which are layer-modulated using layer modulation scheme and the at least two sub-streams are punctured from at least one coded data stream. Furthermore, each of the at least one antenna uses independent transmission power based on channel condition.

Yet, in another aspect of the present invention, a system for transmitting and receiving at least one data stream by at least one user in a wireless communication system having multiple antennas includes at least one transmitter and at least one receiver. More specifically, the at least one transmitter includes a channel encoder for encoding at least one inputted data stream by a channel coding scheme, a puncturing unit for puncturing the at least one inputted coded data stream into at least two sub-streams, a modulating unit for layer-modulating the at least two sub-streams using layer-modulation schemes, and at least one antenna for transmitting the layered-modulated sub-streams via the multiple antennas, wherein transmission power of each antenna is based channel condition. Moreover, the at least one receiver for receiving by at least one user the layered-modulated sub-stream, wherein the each user uses different demodulation scheme.

In another aspect of the present invention, a method of allocating resources to multiple users for transmitting data simultaneously in a wireless communication system includes encoding at least one inputted data stream by a channel coding scheme, puncturing the at least one inputted coded data stream into at least two sub-streams, modulating the at least two sub-streams using layered-modulation schemes in which at least one layer is rotated with respect to at least one other layer, transmitting the layered-modulated sub-streams via the multiple antennas, wherein transmission power of each antenna is based channel condition, and receiving by at least one user the layered-modulated sub-stream, wherein the each user uses different demodulation scheme.

In a further aspect of the present invention, a method of transmitting and receiving at least one data stream in a wireless communication system having multiple antennas includes encoding at least one inputted data stream by a channel coding scheme, puncturing the at least one coded data stream into at least two sub-streams, superposition-modulating the at least two sub-streams using different modulation schemes, wherein modulation schemes are different per user, transmitting the superposition-modulated sub-streams using different transmission power for each antenna based on channel condition, and receiving by at least one user the superposition-modulated sub-stream, wherein the each user uses different demodulation scheme.

Yet, in another aspect of the present invention, a system for transmitting and receiving at least one data stream by at least one user in a wireless communication system having multiple antennas includes at least one transmitter and at least one receiver. The at least one transmitter further comprises a channel encoder for encoding at least one inputted data stream by a channel coding scheme, a puncturing unit for puncturing the at least one inputted coded data stream into at least two sub-streams, a modulating unit for superposition-modulating the at least two sub-streams using different modulation schemes, wherein modulation schemes are different per user, and at least one antenna for transmitting the superposition-modulated sub-streams using different transmission power for each antenna based on channel condition. The at least one receiver is used for receiving by at least one user the superposition-modulated sub-stream, wherein the each user uses different demodulation scheme.

In a further aspect of the present invention, a method of transmitting and receiving at least one data stream in a wireless communication system having multiple antennas includes encoding inputted data streams from multiple users using a channel coding scheme, puncturing at least one coded data stream into at least two sub-streams, superposition preceding the at least two sub-streams along with sub-streams from at least one other user using different modulation schemes, transmitting the each superposition-precoded sub-stream via multiple antennas using different transmission power for each antenna based on channel condition, receiving by a particular user the superposition-precoded sub-streams transmitted via at least two antennas, wherein the particular user extracts its data from the superposition-precoded sub-streams containing data for at least two users, and combining the extracted data received via the at least two antennas by the particular user.

In another aspect of the present invention, a method of transmitting and receiving at least one data stream in a wireless communication system having multiple antennas includes encoding inputted data streams from multiple users using a channel coding scheme, puncturing at least one coded data stream from a first user into at least two sub-streams, superposition preceding the at least two sub-streams from the first user along with sub-streams from a second user and a third user using different modulation schemes, transmitting the superposition-precoded sub-streams from the first user, the second user, and the third user via multiple antennas using different transmission power for each antenna based on channel condition, wherein the sub-streams of the first user includes data included in the sub-streams of the second user as well as in the sub-streams of the third user, receiving by the first user the superposition-precoded sub-streams transmitted via at least two antennas, wherein the first user extracts its data from the superposition-precoded sub-streams containing data for the second user and the third user, and combining the extracted data received via the at least two antennas by the first user.

Yet, in another aspect of the present invention, a method of receiving at least one data stream in a wireless communication system having multiple antennas includes receiving by a first user a superposition precoded sub-streams transmitted via at least two antennas, wherein the particular user extracts data addressed to the particular user from the received superposition-precoded sub-streams containing data for at least one other user, and combining the extracted data received via the at least two antennas by the particular user.

In another aspect of the present invention, a method of modulating a signal using a superposition modulation scheme in a wireless communication system includes selecting a reference modulation symbol from a first group of modulation symbols, selecting at least two modulation symbols from a second group, wherein the at least two modulation symbols are closer in distance to the reference modulation symbol than other modulation symbols in the second group, determining a rotation angle by which the modulation symbols are to be rotated for transmission, wherein the rotation angle is determined when a distance between the reference modulation symbol of the first group and a first modulation symbol of the at least two modulation symbols of the second group is equal to the reference modulation symbol of the first group and a second modulation symbol of the at least two modulation symbols of the second group, and rotating at least one group of the modulation symbols according to the rotation angle.

In a further aspect of the present invention, a method of modulating at least one data stream using a superposition modulation scheme in a wireless communication system includes determining a rotation angle by which modulation symbols are to be rotated for transmission, wherein the rotation angle is determined when a distance between a reference modulation symbol of the first group and a first modulation symbol of the at least two modulation symbols of the second group is equal to the reference modulation symbol of the first group and a second modulation symbol of the at least two modulation symbols of the second group.

It is to be understood that both the foregoing general description and the following detailed description of the present invention are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this application, illustrate embodiment(s) of the invention and together with the description serve to explain the principle of the invention. In the drawings;

FIG. 7 is another exemplary diagram in which layer 1 and layer 2 are both modulated according to the BPSK scheme;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In a wireless communication system, data or data stream(s) can be sent from a single user or multiple users via terminal(s) which can be represented by one or more antennas. In other words, the data streams can be transmitted from a single source or multiple sources via a single transmitter or multiple transmitters to one or more users (or receivers). That is, the same transmitter can be used to transmit the data streams (or signals) from the single source or multiple sources. Alternatively, different transmitters can be used to transmit the data stream from the single source or multiple sources. Furthermore, the data stream transmitted from the single source can carry the same data from a single application or multiple different applications. Moreover. The data streams transmitted from different sources can carry the same data or different data.

In transmitting the data stream(s), same or different coding as well as different modulation can be applied for each antenna (or a transmitter). The same data stream can be coded and punctured into at least two different sub-streams. Here, each sub-stream can use a low order modulation. Thereafter, the sub-streams can be pre-coded/modulated (e.g., superposition coding) and modulated before being sent out via the multiple antennas.

The receiving end can have a single antenna or multiple antennas through which the sub-streams are received. The receiving end (e.g., mobile terminal) receives the composite signal to estimate the channel response for each antenna and decode two separate sub-streams. If necessary, the receiving end can employ successive interference cancellation scheme, which will detect/decode one data sub-stream at first, cancel it from the received composite signals and detect/decode another data sub-stream from the rest, and so on. Another approach is called joint detection, where multiple data sub-streams are detected and decoded simultaneously. Another approach is called iterative detection/decoding or multi-stage detection/decode, where some data sub-stream(s) are tentatively detected or decoded at first. The output of these tentative outputs will be used as inputs to detect other data sub-streams and the sequential tentative outputs of other data sub-stream may be used for the next iterative/stage detection/decoding of the current data sub-stream. This kind of iterative procedures will be repeated until the final outputs satisfy predefined criteria.

Figure 1:
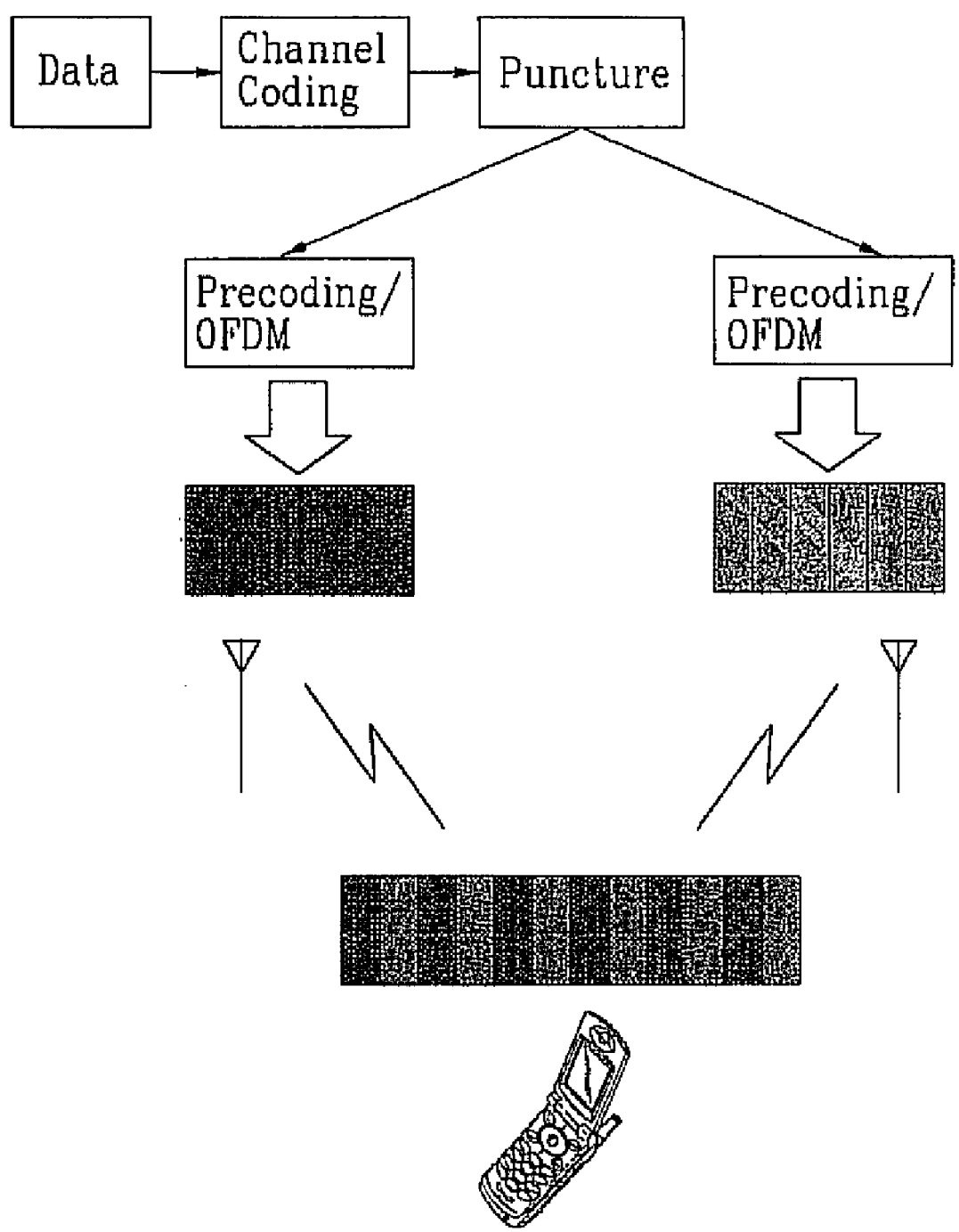
FIG. 1 is an exemplary diagram illustrating transmitting and receiving data in a wireless communication system in soft handoff/handover.

FIG. 1 is an exemplary diagram illustrating transmitting and receiving data in a wireless communication system in soft handoff/handover. From a transmitting end (e.g., base station, access network, Node B, mobile station, or access terminal), data stream is channel coded using any one of various channel coding schemes such as turbo coding, convolutional coding, and Reed-Solomon coding. The coded data stream is then punctured into at least two separate data sub-streams. Thereafter, these two data sub-streams are pre-coded using a pre-coding scheme such as superposition pre-coding (e.g., layer modulation). After the sub-streams are superposition pre-coded, the pre-coded sub-streams are transmitted to the receiver via each antenna located in the transmitter(s). Here, each transmitter or base station can have more than one antenna.

In FIG. 1, each antenna represents a base station from which the pre-coded or layered modulated sub-streams are transmitted. That is, each base station transmits the same pre-coded data sub-streams to the receiving end (e.g., mobile station, access terminal, or mobile terminal). The receiving end receives and combines the sub-streams and decode/demodulates to extract the original data stream. When it is necessary, the receiver may also feedback the detection results, such as transmission success or failure, to transmitter(s) in the following communication.

As illustrated in FIG. 1, the received data stream is combined in a manner in which the data stream size or length is larger/longer than the original data stream. In this case, the length is twice as long. The reason that the length becomes longer is that the punctured and pre-coded sub-streams are combined by the receiving end as shown in FIG. 1.

Furthermore, if the sub-streams are properly pre-coded/superposition modulated, the receiving end can better decode the received signals. In other words, receiving end can oversample, using higher sampling frequency and/or multiple receive antennas, and/or demodulate the received composite signals. Further, the receiving end can receive the composite signal to estimate the channel response for each antenna and decode two separate sub-streams.

At the receiving end, different de-modulation schemes can be applied. If possible, directed de-modulation without channel estimation and equalization can be used. However, if there is channel distortion, channel estimation can be performed on per-channel and/or per-antenna basis or jointly.

After channel estimation has been performed, it is possible to perform detection by using schemes include channel equalization and joint detection, successive interference cancellation (SIC), maximum likelihood detection, and minimum mean squared detection. Channel equalization and joint detection refers to performing channel equalization on each channel and followed by joint detection. The SIC refers to performing channel equalization and detection on the strongest channel, which means this channel may be more possibly successfully detected/decoded. Thereafter, this strongest channel is subtracted from the total received signal before performing equalization and detection on the next strongest channel. The maximum likelihood detection refers to joint channel equalization and detection on all channels based on the maximum likelihood criterion. The minimum mean squared error detection/decoding refers to detect/decode channel either separately or jointly using minimum mean squared criterion. As such, the receiving end can use any one of many detections schemes available, including the schemes described above.

In transmitting the pre-coded sub-streams through the antennas, it is possible to apply water-filling for optimum power splitting between antennas, especially, if the data streams are transmitted from a transmitter having more than one antenna, to allow different antennas to use different transmit power. It is also possible for each antenna to employ different coding and/or modulation scheme based on the antenna channel condition.

Further to the superposition pre-coding being referred to as layer modulation, it can also be referred to as superposition modulation. The superposition pre-coding can be described as a type of modulation in which each modulation symbol has bits corresponding to the base and enhancement component of a flow. More specifically, the superposition modulation divides the data stream into base component that all user(s) can decode, and enhancement component that only user(s) with high signal-to-noise ratio (SNR) or good channel condition can decode. For example, uniform or non-uniform 16-QAM constellations with two (2) bits used for base component and two (2) bits for enhancement component. Further, outer coding and inner coding can be performed independently for base component and enhancement component.

The superposition preceding is performed on the sub-streams. In performing preceding (or superposition modulation), various modulation schemes can be used. The modulation schemes include a phase shift keying (PSK) and rotated-PSK, which can be further defined by a binary phase shift keying (BPSK) and rotated-BPSK, a quadrature phase shift keying (QPSK) and a rotated-QPSK, and a 16PSK and a rotated-16PSK. In addition, other modulation schemes include a quadrature amplitude modulation (QAM) with different amplitudes, QPSK and 16QAM, QPSK and 64QAM, a Gaussian minimum shift keying (GMSK) and PSK, and GMSK and QAM. Preferably, different modulation scheme is used for each transmit antenna.

Figure 2:
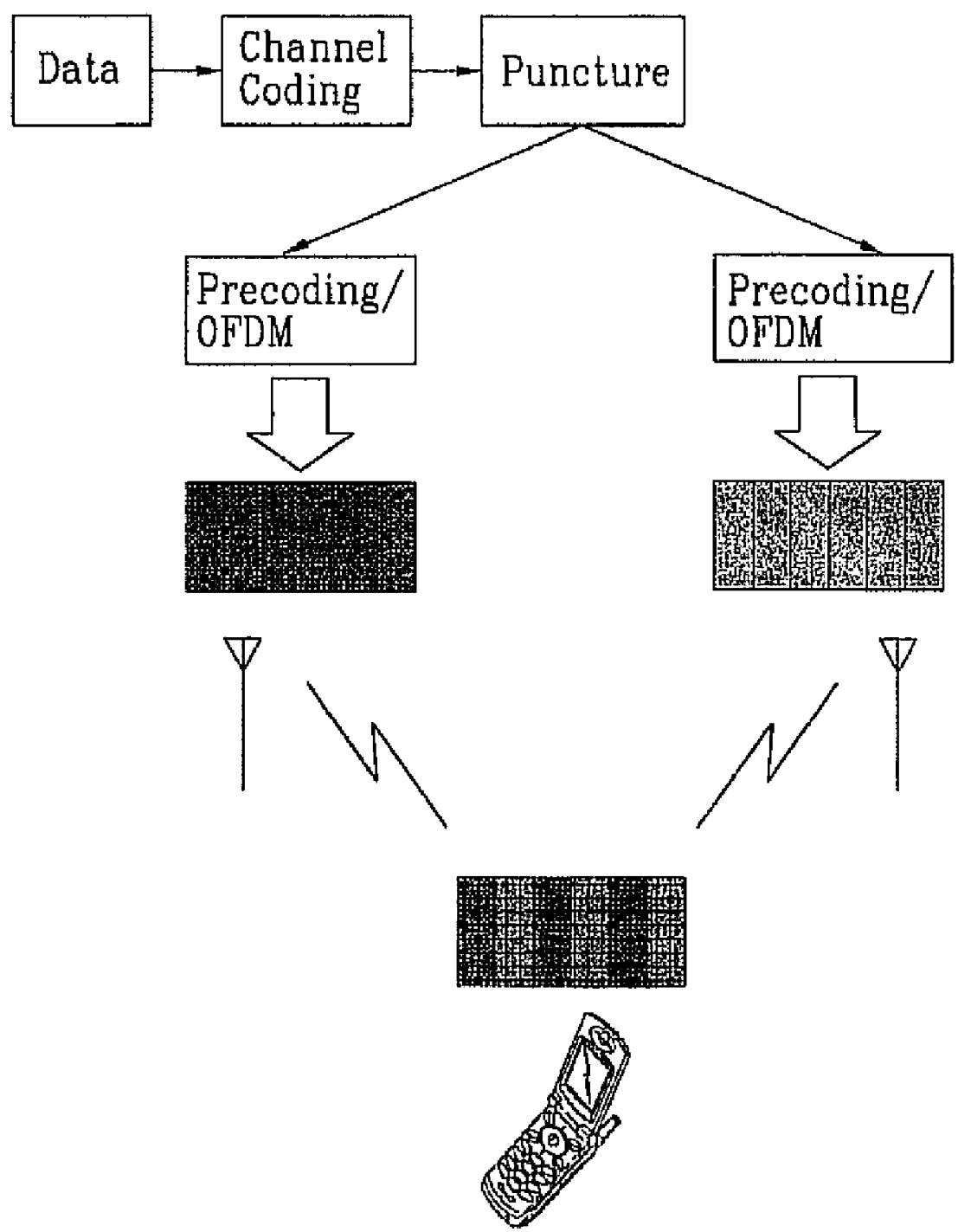
FIG. 2 is an exemplary diagram illustrating transmitting and receiving data in a multiple antenna wireless communication system.

FIG. 2 is an exemplary diagram illustrating transmitting and receiving data in a multiple antenna wireless communication system. To put differently, FIG. 2 illustrates transmission and reception of data using layered modulation in a multi-input, multi-output (MIMO) system. For more details Coding and Soft Handoff Techniques" by Byung Kwan Yi, U.S. patent application Ser. No. 6,094,427.

Since the processes of FIG. 2 are similar to those of FIG. 1, the following discussions refer to the processes that are different from those of FIG. 1. Referring to FIG. 2, the processes up to layered modulation are the same as the processes of FIG. 1. However, in FIG. 2, the transmission of the pre-coded sub-streams are executed by a single transmitter having multiple antennas—two antennas, in this case.

As for the receiving end, it receives and combines the super-positioned or layered modulated sub-streams. Here, the size/length of the received sub-stream is the same as each of the pre-coded sub-stream which means that the received sub-stream is layered-modulated.

Referring to the discussion above with respect to superposition coding (or layered modulation), the data streams from different users can be multiplexed into a same packet in the modulation level. To this end, as discussed, the punctured data streams or sub-streams can be applied different modulation schemes and then multiplexed into one symbol.

Figure 3:
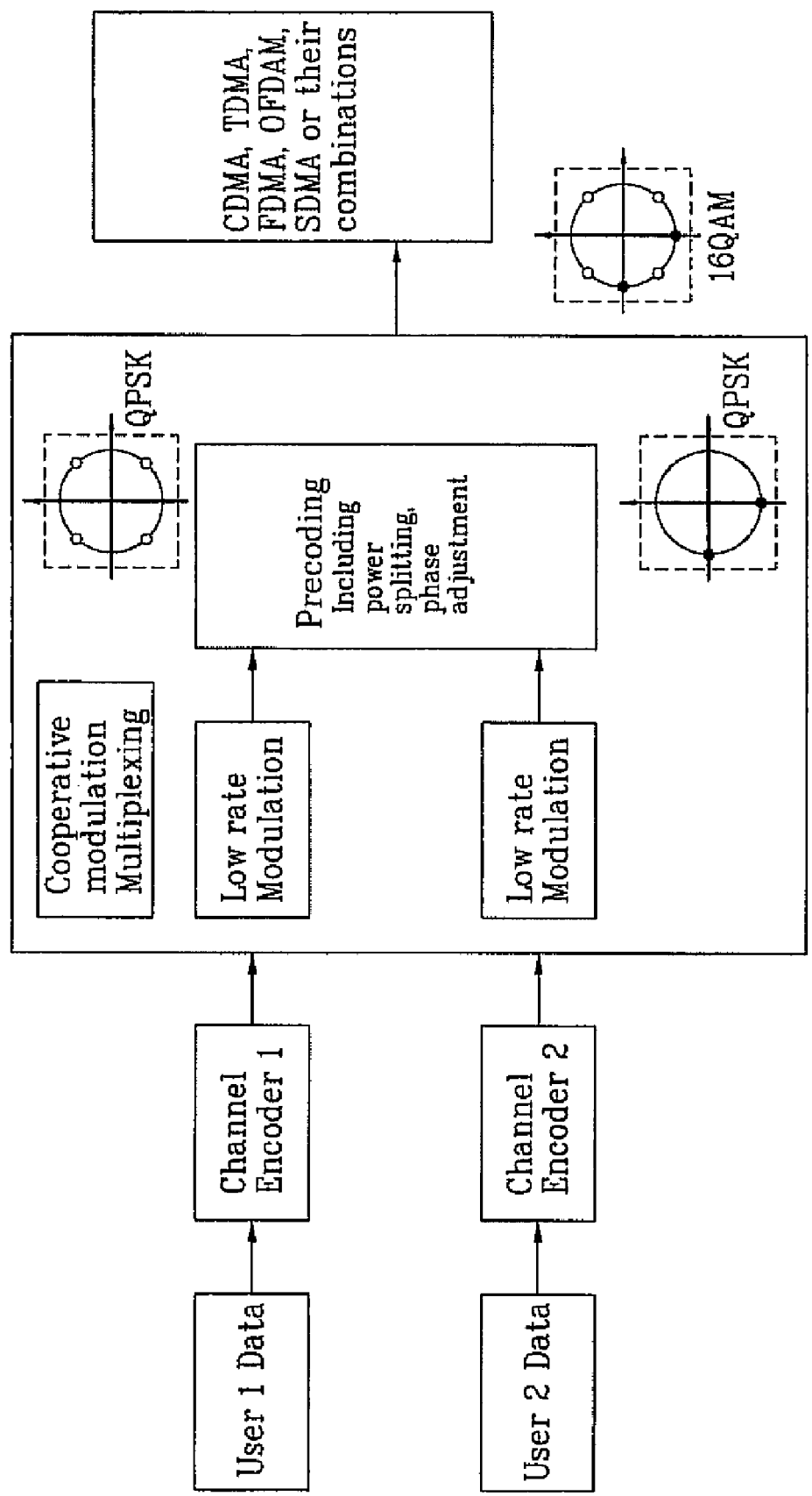
FIG. 3 is an exemplary diagram illustrating superposition modulation or layered-modulation.

FIG. 3 is an exemplary diagram illustrating superposition modulation or layered-modulation. More specifically, referring to FIG. 3, each user's signal or data stream can be modulated with low-order modulation scheme. Thereafter, the superposition modulated or layered-modulated sub-streams can again be multiplexed (or superpositioned) by other multiplexing schemes. Consequently, the data streams can be efficiently multiplexed without requiring additional processing gain and/or additional frequency/time.

As shown in FIG. 3, the channel coded data streams are modulated using a low rate modulation, followed by pre-coding (or superpositioning/multiplexing). Here, each channel coded data stream is modulated by a quadrature phase shift keying (QPSK), and they are pre-coded or superpositioned to 16 quadrature amplitude modulation (QAM). The pre-coding includes power splitting as well as phase adjustment.

When multiple users are simultaneously accommodated within a specified time-frequency slot, various multiplexing schemes and combinations thereof can be used. As such, with superpositioning, where a single symbol can serve multiple users.

More specifically, for example, a user capacity of a channel is traditionally bound by a symbol rate (or baud rate). Usually, one symbol can only serve one user. Moreover, a number of multiplexed data streams cannot exceed a processing gain, $G_p$, of each physical channel or tone. However, by using superpositioning, one symbol can serve $N_m$ users, allowing for increase in the channel user capacity. Simply put, $N \leq N_M \times G_P$.

To illustrate this point regarding superposition pre-coding, consider that a single transmitter can be used to transmit simultaneously data streams to several receiving ends (or users). The data streams can be the same (e.g. TV broadcast) or it may be different for each user (e.g., base station transmitting user-specific information). In addition, assumption can be made that independent data streams are sent to each user from the transmitter having multiple antennas.

That is, in transmitting the multiplexed or superpositioned sub-streams (or symbols), the same combined symbols can be transmitted through the whole beamforming array. This can be referred to as coherent beamforming. Alternatively, each symbol or sub-stream (e.g., some subset of the symbol constellation or each user's sub-symbol) can be transmitted separately or independently through different antennas. This can be referred to as coherent multi input, multi output (MIMO).

Furthermore, if there are multiple beams used for transmission, more user capacity gain can be achieved through spatial multiplexing. More specifically, each beam can carry composite symbol (e.g., single-beamforming or coherent beamforming). Alternatively, each low-order-modulated symbol or sub-stream can be transmitted through a single beam, for example. Alternatively, a combination of the beamforming schemes can be used, which can be described as some beams can carry composite symbols and some beams can be transmitted through a single beam.

In addition, space-time block coding (STBC) can be employed. More specifically, in case of a single-stream STBC, the STBC can be performed after modulation multiplexing or superpositioning and/or performed on multiple inputted low-order-modulated symbols or sub-streams. In case of multi-stream STBC, each sub-stream can be treated as a single STBC, each low-order-modulated symbol or sub-stream can be transmitted through a single STBC stream, and/or some STBC streams can use a combination of the aforementioned schemes, in which each of some streams are treated as a single-stream STBC and each of some low-order-modulated streams is transmitted through a single STBC stream.

In order for successful performance by the superposition scheme, a predetermined rate/power splitting for each user from the transmitting end and the SIC from the receiving end is needed, for example. Further discussions regarding power splitting are made below. If the rate or power slitting is not predetermined, the transmitter will signal the receiver(s) beforehand or at the same time using upper-layer signaling, or preamble or different pilot pattern.

Figure 4:
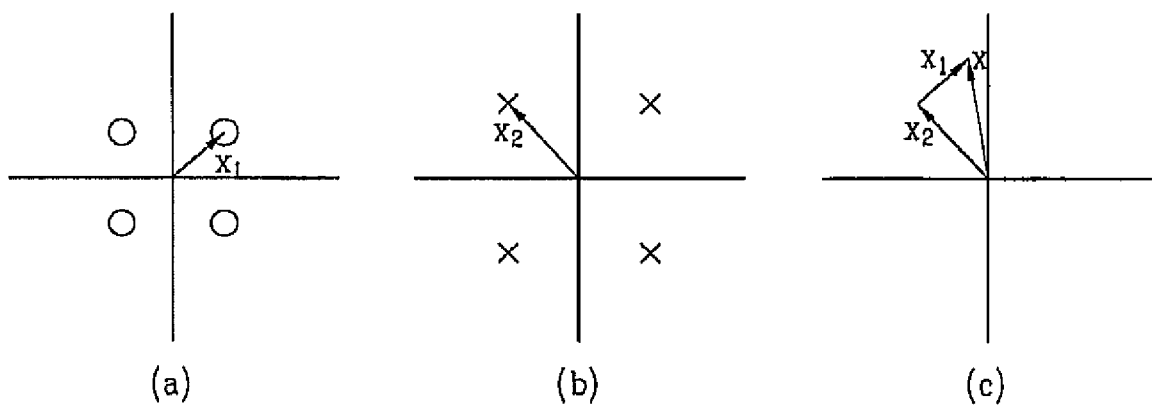
FIG. 4 illustrates an exemplary superposition pre-coding scheme for two users each using QPSK constellation.

FIG. 4 illustrates an exemplary superposition pre-coding scheme for two users each using QPSK constellation. In FIG. 3, the transmitted signal at time k, $x_k$, is the sum of the two user signals and can be expressed by $x_k = x_{1k} + x_{2k}$. Here, each user decodes the data streams independently. The decoding scheme that can be used by the receiving end can be a successive interference cancellation (SIC) scheme.

A main idea here is that if a first user is able to decode its data stream successfully from $x_1$, then if a second user, whose total SNR is same or not as total SNR of the first user, should be able to decode the data of the first user from $x_2$. Subsequently, the second user can better decode its data stream by subtracting the codeword of the first user from the codeword of the second user.

However, due to noise-liked pollution from layer 2 modulations, channel capacity and demodulation performance (e.g., higher bit error rate) for layer 1 symbols can be decreased. By way of illustrating channel capacity loss, for example, the capacity can be expressed by $$C_1 = W \log_2 \left( 1 + \frac{P_1}{\sigma_0^2} \right).$$

However, as a result of capacity loss, the channel capacity of layer 1 can be expressed by $$\tilde{C}_1 = W \log_2 \left( 1 + \frac{P_1}{P_2 + \sigma_0^2} \right).$$

Further, instead of $$C_2 = W \log_2 \left( 1 + \frac{P_2}{\sigma_0^2} \right),$$

layer 2 channel capacity can be expressed by $$\tilde{C}_2 = W \log_2 \left( 1 + \frac{P_2}{\varepsilon + \sigma_0^2} \right),$$

where $\varepsilon$ is the inter-layer interference energy due to remnants of layer 1 energy.

Further, as a result of noise-like pollution, demodulation performance can be decreased in form of higher bit-error rate. By way of illustration, the higher bit error rate is discussed below. Assume that a maximum likelihood detection scheme is employed at the receiving end. The corresponding probability of symbol error can be given by $$P_e \approx NQ\left( \sqrt{\frac{\gamma d_{min}^2}{2}} \right)$$

where $\gamma$ denotes the average signal-to-noise ratio (SNR), N is the number of the nearest neighbors, and $d_{min}$ is the minimum Euclid distance of the combined modulation constellation. Here, due to inference from layer 2, the minimum Euclid distance of layer 1 signal is smaller than the original signal.

It is important to maximize the minimum Euclid distance, $d_{min}^2$, of the layered- or superpositioned-signal constellation without changing the signal power distribution. To this end, a signal rotation approach can be implemented to maximize the minimum Euclid distance, $d_{min}^2$.

Figure 5:
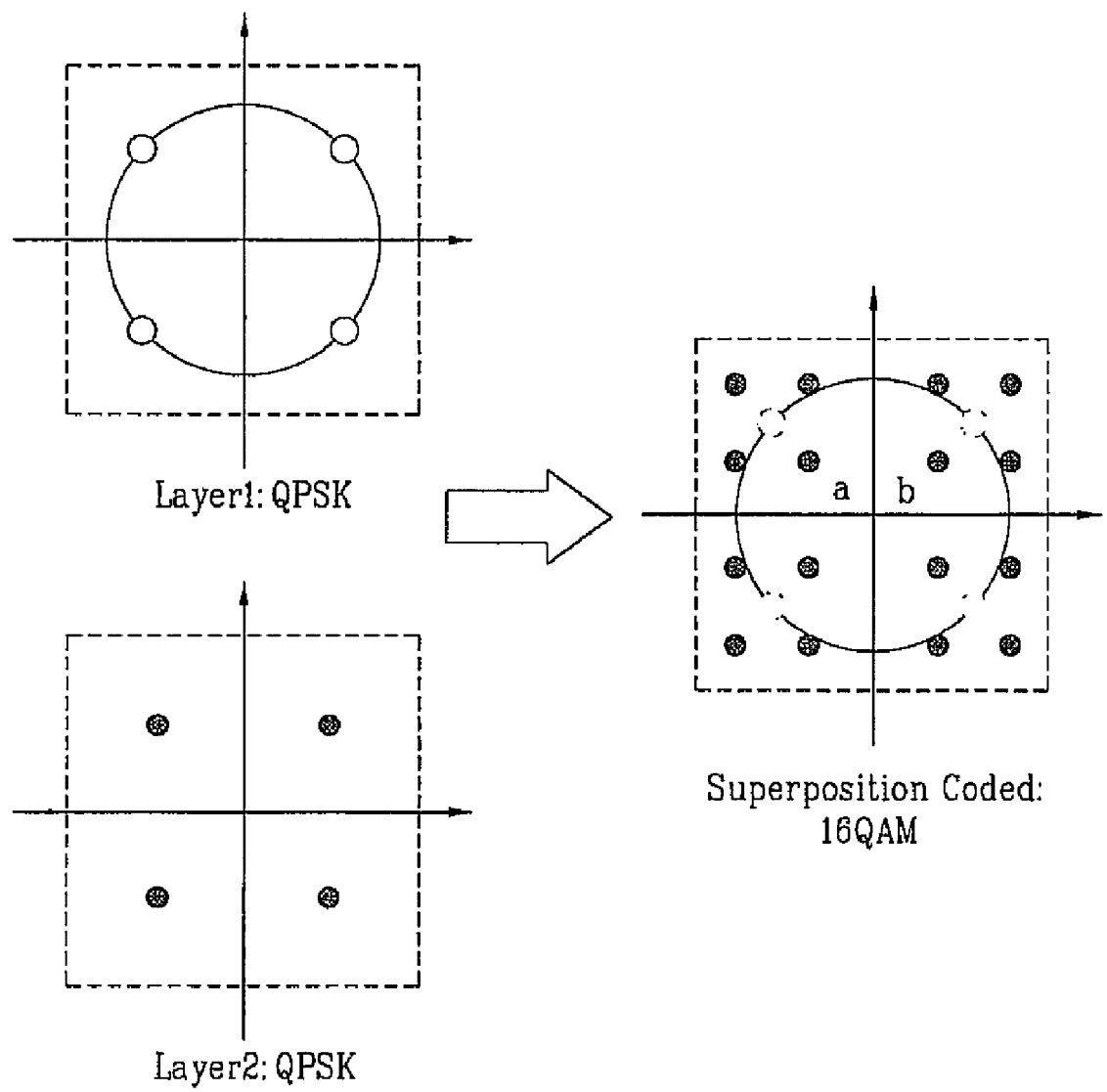
FIG. 5 is an exemplary diagram of superposition modulation.

FIG. 5 is an exemplary diagram of superposition modulation. In FIG. 5, layer 1 (inner layer) and layer 2 (outer layer) are modulated according to the QPSK scheme. Here, it is likely that the superposition modulation results in a mostly non-uniform 16QAM. The transmission powers of layer 1 and layer 2 can be expressed as $P_1 = A_1^2$ and $P_2 = A_2^2$, respectively, where, $A_1 > A_2$.

The superposition coded modulation constellation can be expressed as $$(x \; y) = \left( \pm \frac{\sqrt{2}}{2} A_1 \pm \frac{\sqrt{2}}{2} A_2 \;\; \pm \frac{\sqrt{2}}{2} A_1 \pm \frac{\sqrt{2}}{2} A_2 \right).$$

Further, the position of point a is $$a = [x_a \; y_a]^T = \left[ -\frac{\sqrt{2}}{2} A_1 + \frac{\sqrt{2}}{2} A_2 \;\; +\frac{\sqrt{2}}{2} A_1 - \frac{\sqrt{2}}{2} A_2 \right]^T,$$

and the position of point b is $$b = [x_b \; y_b]^T = \left[ +\frac{\sqrt{2}}{2} A_1 - \frac{\sqrt{2}}{2} A_2 \;\; +\frac{\sqrt{2}}{2} A_1 - \frac{\sqrt{2}}{2} A_2 \right]^T.$$

As such, the minimum Euclid distance of the superposition coded constellation is the same as the distance between a and b, as expressed by $\Delta_{min} = \|a-b\|_2^2 = 2(A_1 - A_2)^2$.

Figure 6:
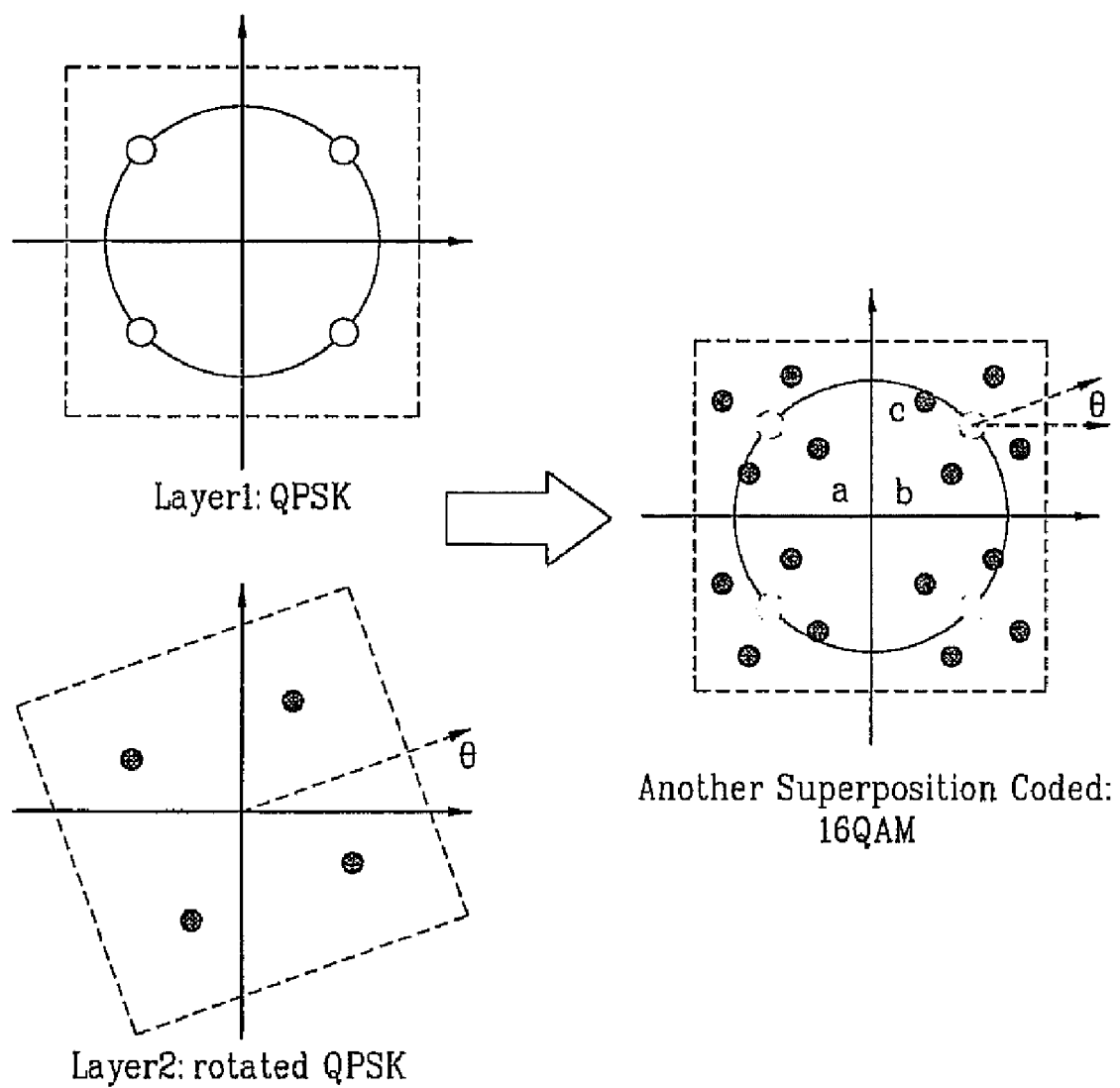
FIG. 6 is another exemplary diagram illustrating superposition modulation.

FIG. 6 is another exemplary diagram illustrating superposition modulation. Similar to FIG. 5, layer 1 (inner layer) and layer 2 (outer layer) are modulated according to the QPSK scheme. However, in FIG. 6, layer 2 modulation constellation is rotated to maximize the minimum Euclid distance of the layered or superpositioned signal constellation.

With the rotated layer 2 modulation constellation, the position of point a can be expressed by $$\hat{a} = [\hat{x}_a \; y_a]^T$$

$$= \left[ -\frac{\sqrt{2}}{2} A_1 + A_2 \cos\left(\frac{\pi}{4} - \theta\right) \;\; +\frac{\sqrt{2}}{2} A_1 - A_2 \sin\left(\frac{\pi}{4} - \theta\right) \right]^T,$$

and the position of point b can be expressed by $$\hat{b} = [\hat{x}_b \quad y_b]^T$$
$$= \left[ +\frac{\sqrt{2}}{2}A_1 - A_2\sin\left(\frac{\pi}{4} - \theta\right) \quad +\frac{\sqrt{2}}{2}A_1 - A_2\cos\left(\frac{\pi}{4} - \theta\right) \right]^T,$$

and position of c can be expressed by $$\hat{c} = [\hat{x}_c \quad y_c]^T$$
$$= \left[ +\frac{\sqrt{2}}{2}A_1 - A_2\cos\left(\frac{\pi}{4} - \theta\right) \quad +\frac{\sqrt{2}}{2}A_1 + A_2\sin\left(\frac{\pi}{4} - \theta\right) \right]^T.$$

Based on these positions, the Euclid distance between $\hat{a}$ and $\hat{b}$ is $$\hat{\Delta}_{ab}(\theta) = \|\hat{a} - \hat{b}\|_2^2$$
$$= \left[-\sqrt{2}A_1 + \left(\cos\left(\frac{\pi}{4} - \theta\right) + \sin\left(\frac{\pi}{4} - \theta\right)\right)A_2\right]^2 +$$
$$\left[\cos\left(\frac{\pi}{4} - \theta\right) + \sin\left(\frac{\pi}{4} - \theta\right)\right]^2 A_2^2$$

Further, the Euclid distance between $\hat{a}$ and $\hat{c}$ is $$\hat{\Delta}_{ac}(\theta) = \|\hat{a} - \hat{b}\|_2^2$$
$$= \left[-\sqrt{2}A_1 + 2\cos\left(\frac{\pi}{4} - \theta\right)A_2\right]^2 + 4\sin^2\left(\frac{\pi}{4} - \theta\right)A_2^2.$$

Consequently, with respect to the minimum Euclid distance for a user sending the data stream to two users, for example, can be maximized when $\hat{\Delta}_{min} = \Delta_{ab}(\theta_{opt}) = \Delta_{ac}(\theta_{opt})$.

The discussion above regarding superposition pre-coding scheme as described in FIGS. 4-6 can be further described as follows. A reference modulation symbol from a first group of modulation symbols can be selected. The reference modulation symbol can be located in a first layer and can be based on power or power level. As such, the first group of the modulation symbols can be associated with the first layer.

In addition, a multiple modulation symbols from a second group can be selected. The multiple modulation symbols are closer in distance to the reference modulation symbol than other modulation symbols of the second group are to the reference modulation symbol. As such, the second group of the modulation symbols can be associated with the second layer. Moreover, each group of the modulation symbols, such as the first group and the second group, comprises more than one modulation symbol.

Thereafter, a rotation angle by which the modulation symbols are to be rotated for transmission can be determined. Here, the rotation angle can be determined when a distance between the reference modulation symbol of the first group and a first modulation symbol of the multiple modulation symbols of the second group is equal to the reference modulation symbol of the first group and a second modulation symbol of the multiple modulation symbols of the second group. Lastly, at least one group of the modulation symbols according to the rotation angle can be rotated.

The discussion of above relates to an example where both layers use the QPSK schemes. However, the above idea is not limited to both layers using the QPSK schemes but can also be applied to any other possible combinations of the same or different modulation types. For example, as illustrated in FIG. 7, layer 1 and layer 2 are both modulated according to the BPSK scheme. Here, layer 2 BPSK constellation is rotated. Consequently, the superposition modulation results in QPSK.

Figure 8:
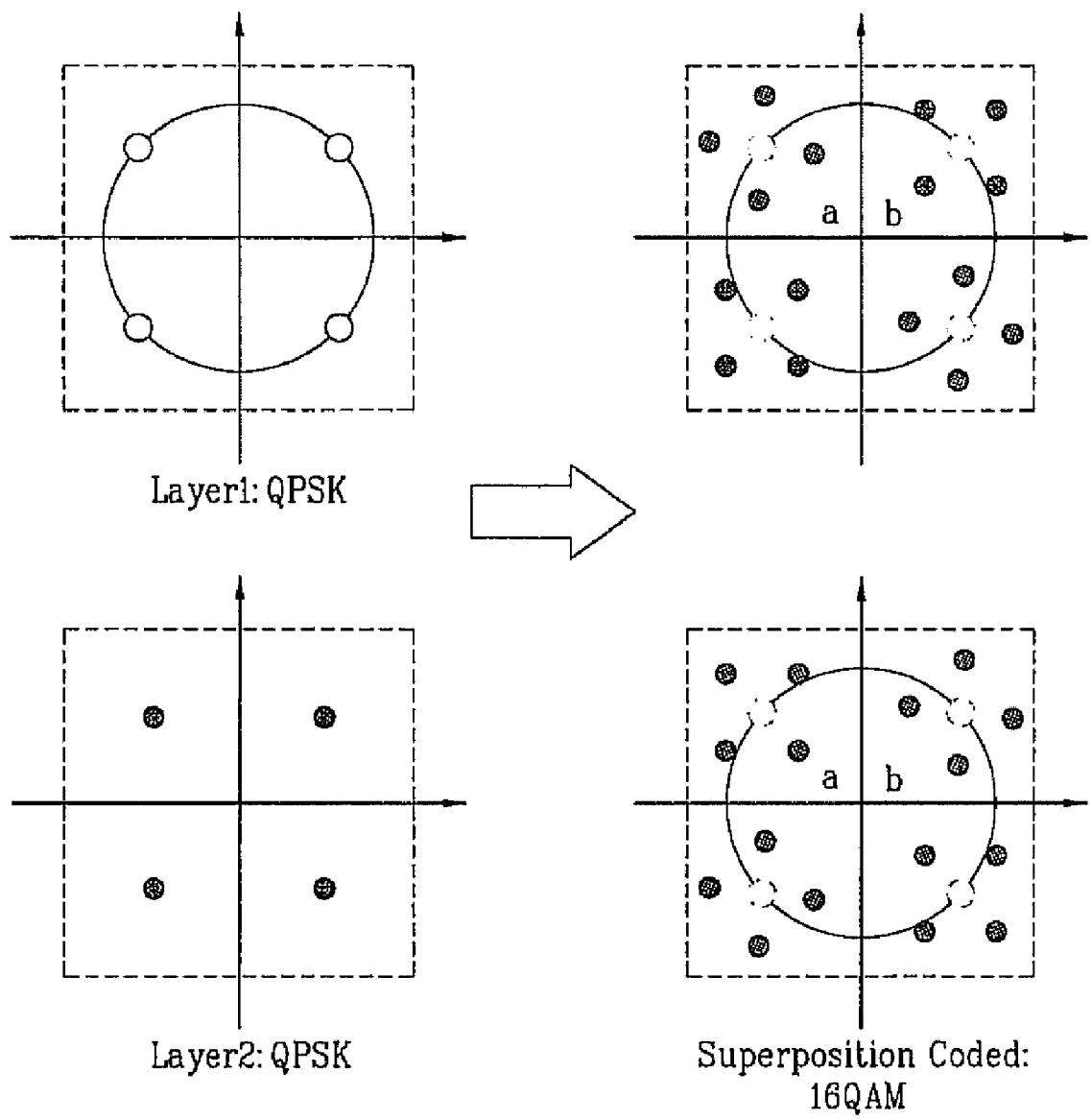
FIG. 8 is another exemplary diagram in which some or all of layer 2 signal modulation constellation are properly rotated before superposition is performed thereon.

Further, as illustrated in FIG. 8, some or all of layer 2 signal modulation constellation can be properly rotated before superposition so that the minimum Euclid distance of the layered or superpositioned signal can be maximized. This idea can be applied on any other possible combinations of different or same modulation types.

As discussed, different transmission power for different antennas based on channel condition can be employed. This is assuming that the channel condition is known. In possible situations where the channel condition is not known, equal transmission power may be applied to each antenna. Alternatively, a pre-defined transmission power scheme may be applied to each antenna. For example, assuming there are two antennas, a first antenna transmits using a specified transmission power, and a second antenna transmits using a higher transmission power than that of the first antenna.

With this, by way of illustration, two sub-streams can be independently transmitted through two different antennas, thus allowing the system to achieve spatial multiplexing gain (or spatial diversity). Furthermore, the spatial multiplexing gain can be achieved with two receivers/antennas jointly decoding the received composite stream.

After the transmitting end transmits the precoded sub-streams, the receiving end can apply different demodulation schemes to extract the original data. In performing demodulation, as discussed, it is preferable to use directed demodulation without channel estimation and equalization. However, channel estimation and equalization may be necessary if the channel condition is poor or if there is channel distortion. As such, if there is channel distortion, channel estimation may be performed on per-channel and/or per-antenna basis. After the channel estimation, various detection schemes can be performed.

For example, channel equalization can be performed on each channel, followed by joint detection. Moreover, a successive interference cancellation scheme can be used in which channel equalization and detection is performed on the channel having the strongest or best condition. Subsequently, this channel can be subtracted from the total received signal before the equalization and detection of the next strongest channel. Further, a maximum-likelihood detection scheme can be used in which a joint channel equalization and detection are performed on all channels.

If the transmitter is used to serve multiple users at the same time or in the same symbol (or the same slot), the transmitter may allocate the channel resources to other served users based on different quality of service (QoS) requirements. Here, the channel resources include transmission power, frequency subbands (e.g., OFDM tones), sub-symbol time, and spreading sequences (e.g., PN code).

For example, based on optimizing Shannon capacity, the transmitter generally transmits more power to the user(s) with better channel conditions and less to relatively less power to the user(s) with poor channel conditions with respect to the maximization of the sum throughput of all users. As another example, with respect to the delay of each user data rate (e.g., optimizing delay-limited capacity), the transmitter may allocate more channel resources to the weak user(s) which have poor channel conditions so that the weak user(s) may obtain higher data rate. In comparison, the transmitter of the first example bases its stronger transmission power on user(s) having good/better channel conditions whereas the transmitter of the second example bases its stronger transmission power on user(s) having poor/weaker channel conditions.

It is possible for the transmitter to employ a combination of the two examples. More specifically, the transmitter may transmit using more power to user(s) having weaker channel condition for delay-sensitive users. Alternatively, the transmitter may transmit using more power to user(s) having stronger channel condition for throughput-sensitive users.

As such, it is important to be able to accurately estimate the channel condition of the user or receiver. To this end, the transmitter can estimate the channel condition when each user sends signal back to the transmitter. This situation can be applicable in time-division multiple (TDD) situations. Alternatively, each user or receiver can estimate the channel condition and send back to the transmitter through a feedback channel (e.g., data rate control ARC) channel or a channel quality indicator (CQI) channel). This situation can be applicable in code division multiple access (CDMA) 2000 evolution-data only (EV-DO).

Usually, the signal for a weak user can be superposition pre-coded with the signal for a strong user with a better channel condition. Each user can feedback its channel condition information through DRC channels to the transmitter. Typically, the weak user's data will be transmitted using lower data rate formation, with possible high-rate channel coding and/or low-order modulation. For example, a larger portion of the total transmission power (e.g., ⅔) can be allocated to the user having better channel condition while a smaller portion of the total transmission power (e.g., ⅓) can be allocated to the user having worse channel condition.

In the process, the transmitter may take into consideration the delay, forward error rate (FER) and/or bit error rate (BER), or other QoS requirements of each user before allocating the channel resources to each user. If a user with high data rate requirement or low-delay requirement or high QoS requirement, the transmitter will possibly use more channel resources, such as more transmit power, more data tone (if OFDMA is used), or more spreading sequence (if CDMA or MC-CDMA is used).

If the same transmit power is used to transmit to two users in superposition coding and/or the transmit powers of the two users are close to each other, which may make separation of the signals difficult for the users/receivers, then two different modulation schemes may be used. For example, a first user uses the BPSK scheme while a second user uses $\pi/2$ rotated-BPSK scheme. Alternatively, the first user uses BPSK scheme while the second user uses the QPSK scheme. Moreover, the first user uses $\pi/4$ BPSK scheme while the second user uses the QPSK scheme, or the first user uses the classic BPSK scheme while the second user uses the $\pi/4$ rotated QPSK scheme.

Further, modulation diversity can be applied. The modulation diversity can be used for possibly replacing existing traditional modulation scheme(s). It can be used for superposition-coding (or superposition-modulating) or layered-coding (or layered-modulating) scheme so that every layer can be modulated with modulation diversity or some of the layers (or users) can be modulated using modulation diversity. Further, the modulation diversity can be used in multi-transmitter cases, such as MIMO or multi input, single output (MISO), so that the signals from every antenna/transmitter or some of the antennas/transmitters can be modulated using modulation diversity.

Further, the modulation diversity can also be used for OFDM, OFDMA, MC-CDMA, CDMA, frequency division multiple access (FDMA), or time division multiple access (TDMA). Moreover, the modulation diversity can be used for time division multiplexing (TDM), code division multiplexing (CDM), or frequency division multiplexing (FDM) so that the signals of every symbol/code/frequency or some of the symbol/code/frequency can be modulated using modulation diversity.

Figure 9:
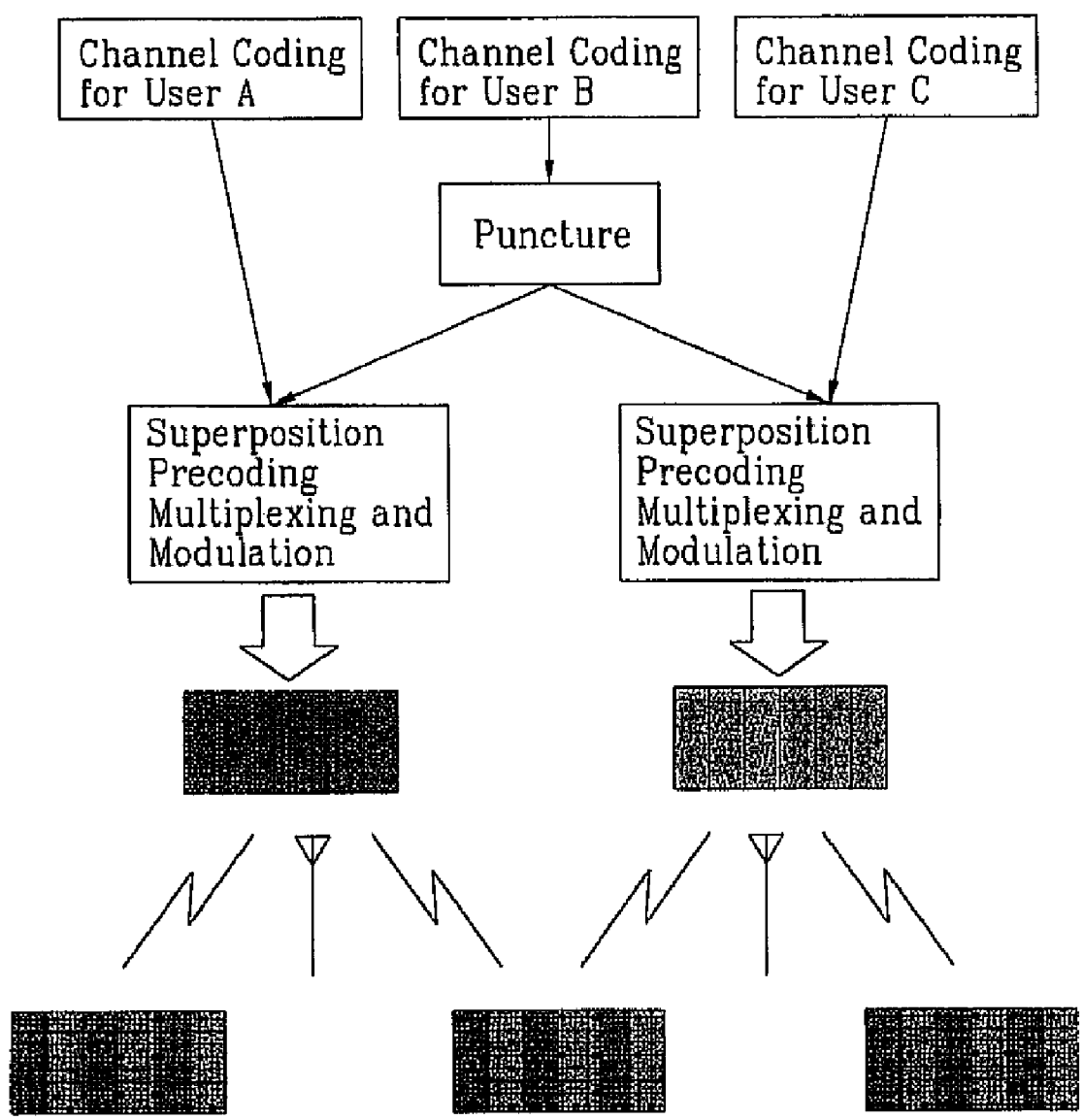
FIG. 9 is an exemplary diagram illustrating transmitting data and receiving the data by a multiple users in a wireless communication system.

FIG. 9 is an exemplary diagram illustrating transmitting data and receiving the data by a multiple users in a wireless communication system. In FIG. 9, User B receives signals from two different antennas (e.g., two separate antenna arrays, two base stations, two access points, or any combination thereof) while User A and User C are served by only one antenna each (e.g., one antenna array, one base station, or one access point). After the data for respective users are coded, the data for User B is punctured, and a part of User B's data is sent along with User A's data in a single data packet (e.g., data frame, OFDM symbol, CDM symbol, MC-CDMA symbol, or multi-user packet). The other part or the remaining part of User B's data is sent along with User C's data in a single data packet (e.g., data frame, OFDM symbol, CDM symbol, MC-CDMA symbol, or multi-user packet).

The data addressed for all the users are then superposition pre-coded, multiplexed, and modulated before being transmitted to respective users via two antennas. User B then subtracts its data from the two signals received from the two antennas. After User B extracts its data, it combines them before demodulation or before decoding. Alternatively, User B can also combine them after demodulation or after decoding. In other words, the extracted data can be combined before or after demodulation/decoding.

As discussed, the length or size of the combined sub-stream can be longer than the transmitted sub-stream, as described with respect to FIG. 1. Alternatively, the length or size of the combined sub-stream can be the same length/size as the length/size of the transmitted sub-stream, as described with respect to FIG. 2.

Figure 10:
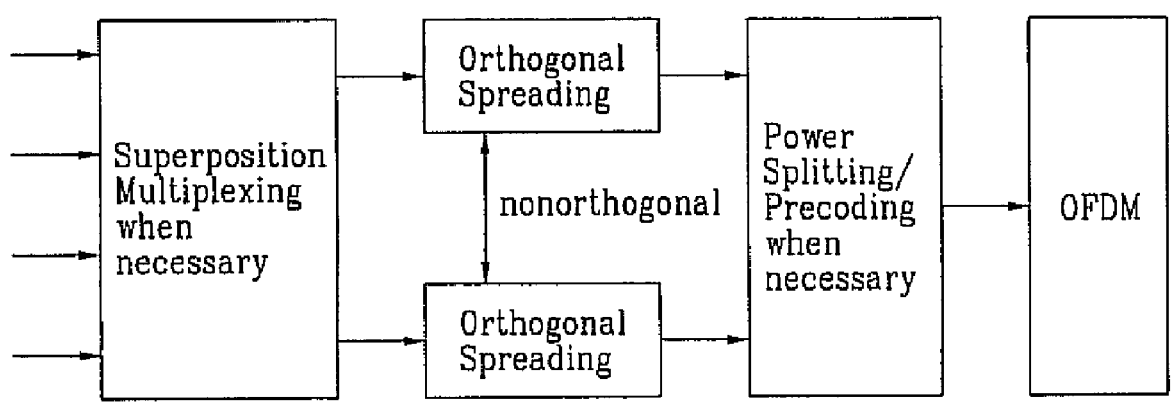
FIG. 10 is an exemplary diagram illustrating power splitting between antennas.

FIG. 10 is an exemplary diagram illustrating power splitting between antennas. Here, power splitting relates to transmission of sub-streams or signals using different transmission power per antenna. That is, based on a total amount of transmit power, the transmit power is split or assigned independently per each antenna. The power split can be based on the channel condition, for example.

Figure 11:
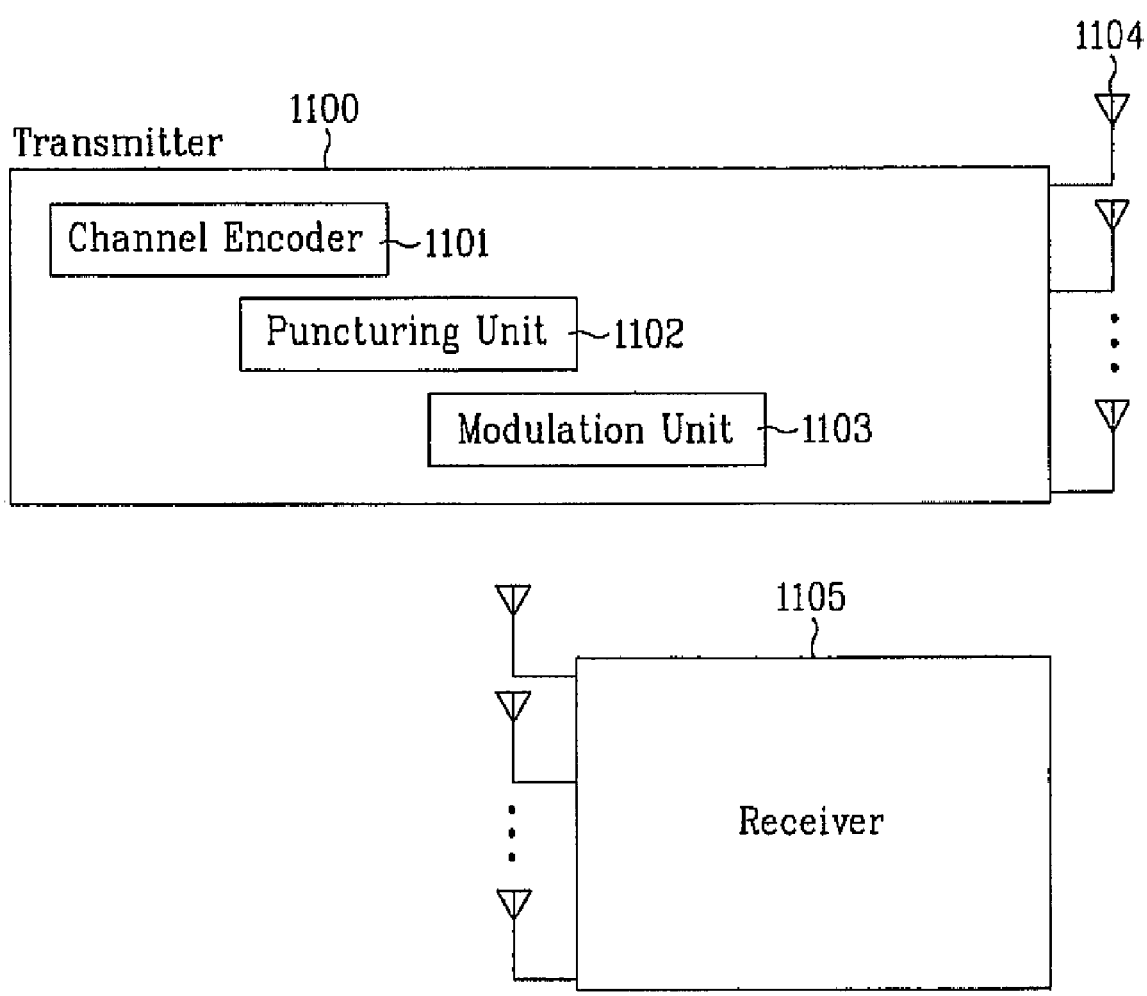
FIG. 11 is an exemplary diagram illustrating a system for transmitting and receiving at least one data stream by at least one user in a wireless communication system having multiple antennas.

FIG. 11 is an exemplary diagram illustrating a system for transmitting and receiving at least one data stream by at least one user in a wireless communication system having multiple antennas. Referring to FIG. 11, the system can comprise at least one transmitter 1100 and at least one receiver 1105. More specifically, at least one transmitter 1100 can include a channel encoder 1101 for encoding at least one inputted data stream by a channel coding scheme, and a puncturing unit 1102 for puncturing the at least one inputted coded data stream into at least two sub-streams.

In addition, the transmitter 1100 can include a modulating unit 1103 for layer-modulating the at least two sub-streams using layer-modulation schemes, or alternatively, for superposition-modulating the at least two sub-streams using different modulation schemes, wherein modulation schemes are different per user. Further, the transmitter 1100 can include at least one antenna 1104 for transmitting the layered-modulated sub-streams via the multiple antennas, wherein transmission power of each antenna is based channel condition or alternatively, for transmitting the superposition-modulated sub-streams using different transmission power for each antenna based on channel condition.

At the receiving end 1105, there can be at least one receiver for receiving by at least one user the layered-modulated sub-stream, wherein the each user uses different demodulation scheme.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of modulating data streams using a superposition modulation scheme by a modulator of a transmitter in a wireless communication system, the method comprising:

modulating a first data stream to output a first group of modulation symbols to be transmitted to a first mobile terminal;

modulating a second data stream to output a second group of modulation symbols to be transmitted to a second mobile terminal; and performing superposition modulation on the first and second groups of modulation symbols, wherein performing the superposition modulation comprises:

selecting a reference modulation symbol from the first group of modulation symbols, selecting at least two modulation symbols from the second group of modulation symbols, wherein the at least two modulation symbols are closer in distance to the reference modulation symbol than other modulation symbols in the second group, determining a rotation angle by which the modulation symbols are to be rotated for transmission, wherein the rotation angle is determined when a distance between the reference modulation symbol of the first group and a first modulation symbol of the at least two modulation symbols of the second group is equal to the distance between the reference modulation symbol of the first group and a second modulation symbol of the at least two modulation symbols of the second group, rotating the second group of modulation symbols according to the rotation angle, wherein a constellation of the superposition modulation is expressed by $$(x\ y) = \left( \pm\frac{\sqrt{2}}{2}A_1 \pm \frac{\sqrt{2}}{2}A_2 \ \pm\frac{\sqrt{2}}{2}A_1 \pm \frac{\sqrt{2}}{2}A_2 \right)$$

in which a position of a first point, a, is $$[x_a\ y_a]^T = \left[ -\frac{\sqrt{2}}{2}A_1 + \frac{\sqrt{2}}{2}A_2 \ +\frac{\sqrt{2}}{2}A_1 - \frac{\sqrt{2}}{2}A_2 \right]^T$$

and a position of a second point, b, is $$[x_b\ y_b]^T = \left[ +\frac{\sqrt{2}}{2}A_1 - \frac{\sqrt{2}}{2}A_2 \ +\frac{\sqrt{2}}{2}A_1 - \frac{\sqrt{2}}{2}A_2 \right]^T,$$

wherein a minimum Euclid distance is the same as a distance between a and b which is expressed by $\Delta_{min} = |a-b|_2^2 = 2(A_1-A_2)^2$, wherein a constellation associated with the second group is rotated through which the position of the first point, a, becomes $$\hat{a} = [\hat{x}_a\ y_a]^T$$
$$= \left[ -\frac{\sqrt{2}}{2}A_1 + A_2\cos(\frac{\pi}{4}-\theta) \ +\frac{\sqrt{2}}{2}A_1 - A_2\sin(\frac{\pi}{4}-\theta) \right]^T,$$

the position of the second point, b, becomes $$\hat{b} = [\hat{x}_b\ y_b]^T$$
$$= \left[ +\frac{\sqrt{2}}{2}A_1 - A_2\sin(\frac{\pi}{4}-\theta) \ +\frac{\sqrt{2}}{2}A_1 - A_2\cos(\frac{\pi}{4}-\theta) \right]^T,$$

and a position of a third point, c, becomes $$\hat{c} = [\hat{x}_c\ y_c]^T$$
$$= \left[ +\frac{\sqrt{2}}{2}A_1 - A_2\cos(\frac{\pi}{4}-\theta) \ +\frac{\sqrt{2}}{2}A_1 + A_2\sin(\frac{\pi}{4}-\theta) \right]^T, \text{ and}$$

multiplexing the first group of modulation symbols and the rotated second group of modulation symbols to be transmitted to the first and second mobile terminals.

2. The method of claim 1, wherein each group of the modulation symbols comprises at least one modulation symbol.

3. The method of claim 1, wherein the reference modulation symbol is located in layer 1.

4. The method of claim 1, wherein the reference modulation symbol is located in layer 1 based on power.

5. The method of claim 1, wherein the first group of the modulation symbols are associated with a first layer and the second group of the modulation symbols are associated with a second layer.

6. The method of claim 5, further comprising transmitting a multiplexed modulation symbols which are the modulation symbols multiplexed from the first group and the second group.

7. The method of claim 1, wherein the second group of the modulation symbols are rotated to maximize a minimum distance of the superpositioned signal constellation.

8. The method of claim 1, wherein the Euclid distance between $\hat{a}$ and $\hat{b}$ is $$\hat{\Delta}_{ab}(\theta) = \|\hat{a}-\hat{b}\|_2^2$$
$$= \left[ -\sqrt{2}A_1 + (\cos(\frac{\pi}{4}-\theta)+\sin(\frac{\pi}{4}-\theta))A_2 \right]^2 +$$
$$\left[ \cos(\frac{\pi}{4}-\theta)+\sin(\frac{\pi}{4}-\theta) \right]^2 A_2^2,$$

and the Euclid distance between $\hat{a}$ and $\hat{c}$ is $$\hat{\Delta}_{ac}(\theta) = \|\hat{a} - \hat{b}\|_2^2 = \left[-\sqrt{2}A_1 + 2\cos\left(\frac{\pi}{4} - \theta\right)A_2\right]^2 + 4\sin^2\left(\frac{\pi}{4} - \theta\right)A_2^2.$$

9. The method of claim 8, wherein a minimum Euclid distance is maximized when $\hat{\Delta}_{min} = \Delta_{ab}(\theta_{opt}) = \Delta_{ac}(\theta_{opt})$.

* * * * *